United States Patent [19]
Okada

[11] Patent Number: 5,323,890
[45] Date of Patent: Jun. 28, 1994

[54] TRANSMISSION ASSEMBLY FOR WORKING VEHICLES

[75] Inventor: Hideaki Okada, Takarazuka, Japan

[73] Assignee: Kanzaki Kokyukoki Mfg. Co., Ltd., Amagasaki, Japan

[21] Appl. No.: 29,436

[22] Filed: Mar. 11, 1993

[30] Foreign Application Priority Data

Apr. 9, 1992 [JP] Japan .................. 4-030467

[51] Int. Cl.$^5$ ............................................. B60K 41/26
[52] U.S. Cl. .................. 192/4 R; 192/4 A
[58] Field of Search .............. 192/4 R, 4 A; 475/237, 475/230, 200, 206

[56] References Cited

U.S. PATENT DOCUMENTS

| | | | |
|---|---|---|---|
| 3,834,498 | 9/1974 | Ashfield | 192/4 A |
| 3,905,457 | 9/1975 | Shea | 192/4 A X |
| 4,263,824 | 4/1981 | Mueller | 475/237 X |
| 4,555,962 | 12/1985 | Bucarelli | 475/237 X |
| 4,671,373 | 6/1987 | Sigl | 192/4 A X |
| 4,722,243 | 2/1988 | Giere | 192/4 A X |
| 5,092,436 | 3/1992 | Sterler | 192/4 A |

FOREIGN PATENT DOCUMENTS 59-106322 6/1984 Japan .
2-28028 1/1990 Japan .................. 192/4 A Primary Examiner—Leslie A. Braun
Assistant Examiner—Andrea Pitts

[57] ABSTRACT

A differential-locking positive clutch (3) for disabling a vehicle differential gearing (2) is operated by a brake-actuating device (4) for a vehicle-braking brake (1) through a connecting mechanism (34) including a spring (6). The spring may store an actuating force for a clutch-operating member (5), which is preferably composed of a slidable shaft, when interlockable members of the clutch are not in alignment with each other. The connecting mechanism preferably includes a movable first engaging member (7) which is engaged to the clutch-operating member such that a movable second engaging member (48) operated by a clutch-operating device (45) may also be engaged to the clutch-operating member so as to permit an operation of the locking clutch independently of the brake. Both of a safe stopping of vehicle at its straight travel condition and a reduction of the vehicle braking distance are successfully attained.

4 Claims, 4 Drawing Sheets

TRANSMISSION ASSEMBLY FOR WORKING VEHICLES

FIELD OF THE INVENTION

This invention relates to a transmission assembly for working vehicles such as mower tractors. More particularly, the present invention relates to a transmission assembly for a working vehicle comprising a brake for braking the vehicle and a differential gearing with which a differential-locking clutch of a positive clutch type is associated.

BACKGROUND OF THE INVENTION

A prior art vehicle transmission assembly is known from JP, A No. 59-106322 in which a differential-locking clutch is operated in response to the actuation of a brake for braking the vehicle. In this case, a differential gearing with which the locking clutch is associated is disabled by the operation of locking clutch so that the vehicle is stopped necessarily at its straight travel condition whereby safety is secured. The transmission assembly disclosed in the Japanese publication set forth above is fashioned such that the differential-locking clutch is operated exclusively by a brake-actuating device for the brake.

In a case where this prior art is applied to a vehicle transmission assembly including a differential-locking clutch of a positive clutch type which comprises mutually interlocable clutch members of one and the other sides, these clutch members may cause a slipping contact with each other if the clutch members are not in a proper alignment of causing an interlocking between them when the locking clutch is operated by a brake-actuating device. When this is caused, operation of the brake-actuating device to its final position where it actuates the brake fully is delayed so that the braking distance of vehicle is prolonged.

Further, a differential gearing provided in a working vehicle which is often traveled on grounds of bad trafficability is often required or desired to be disabled. The differential-locking clutch which is operated exclusively by a brake-actuating device will not permit the differential gearing to be disabled at a non-actuated condition of the brake.

Accordingly, a primary object of the present invention is to provide an improved vehicle transmission assembly of the type set forth above in which a differential-locking clutch is operated by a brake-actuating device without causing any delay of the full actuation of brake whereby a short braking distance of the vehicle is assured.

An attendant object of the present invention is to provide a vehicle transmission assembly in which the locking clutch is operatively connected to the brake-actuating device so as to permit an independent operation of the locking clutch by means of a separate clutch-operating device.

BRIEF DESCRIPTION OF THE DRAWINGS

Other objects and advantages of the present invention will become readily apparent as the specification is considered in conjunction with the accompanying drawings in which.

SUMMARY OF THE INVENTION

Figure 2:
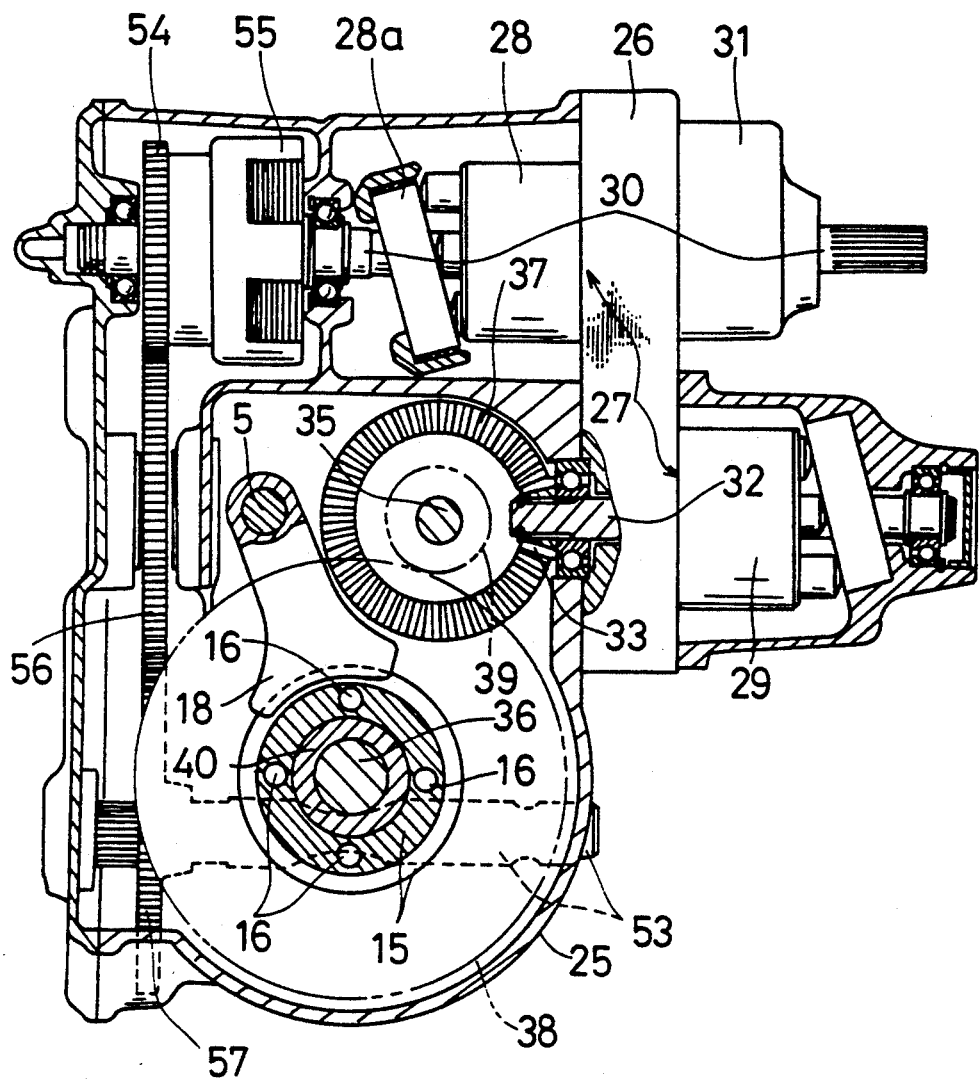
FIG. 2 is a sectional side view, partially developed, of a transmission casing employed in the mower tractor set forth above.
Figure 3:
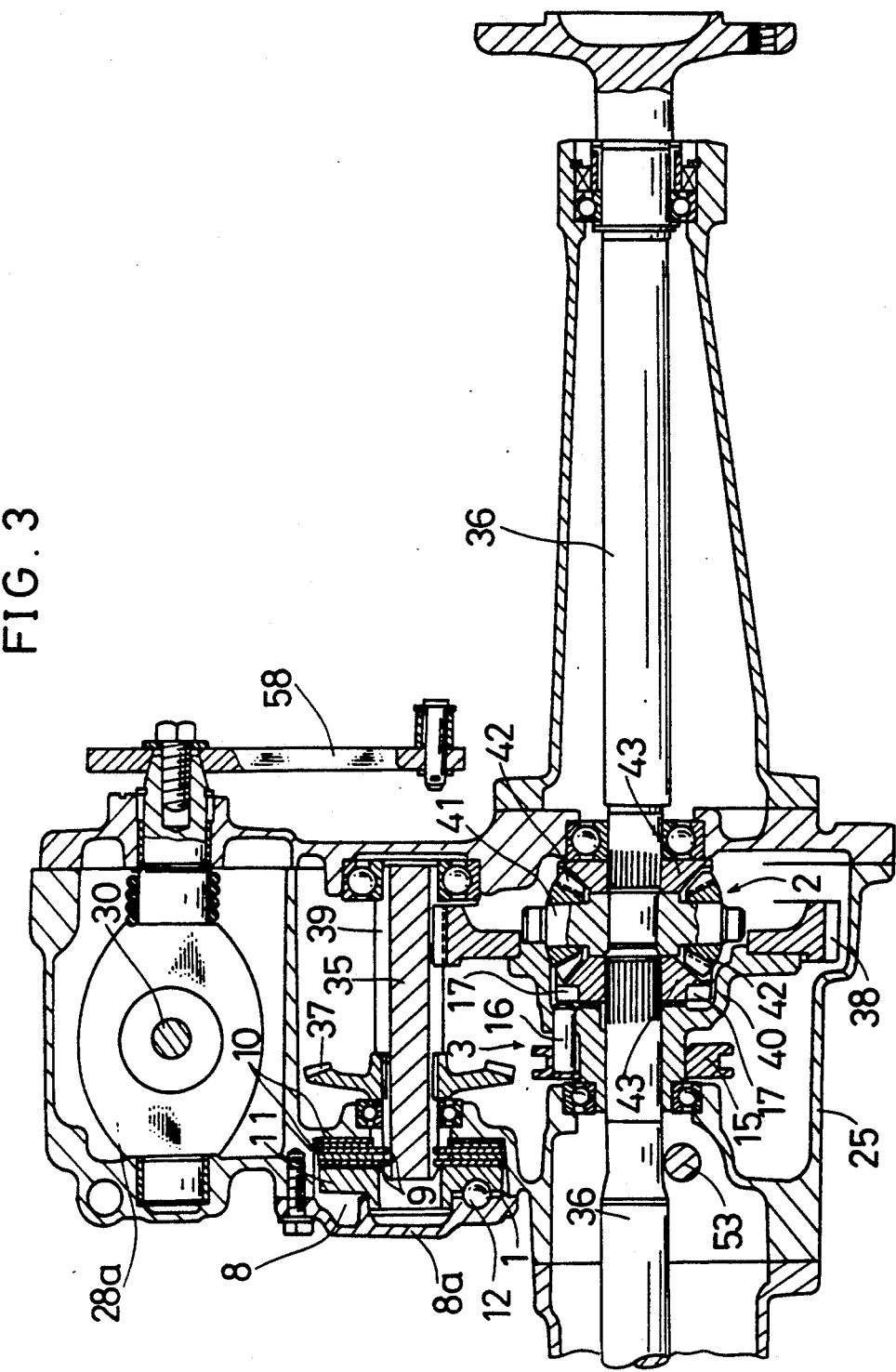
FIG. 3 is a sectional front view of the transmission casing shown in FIG. 2.
Figure 4:
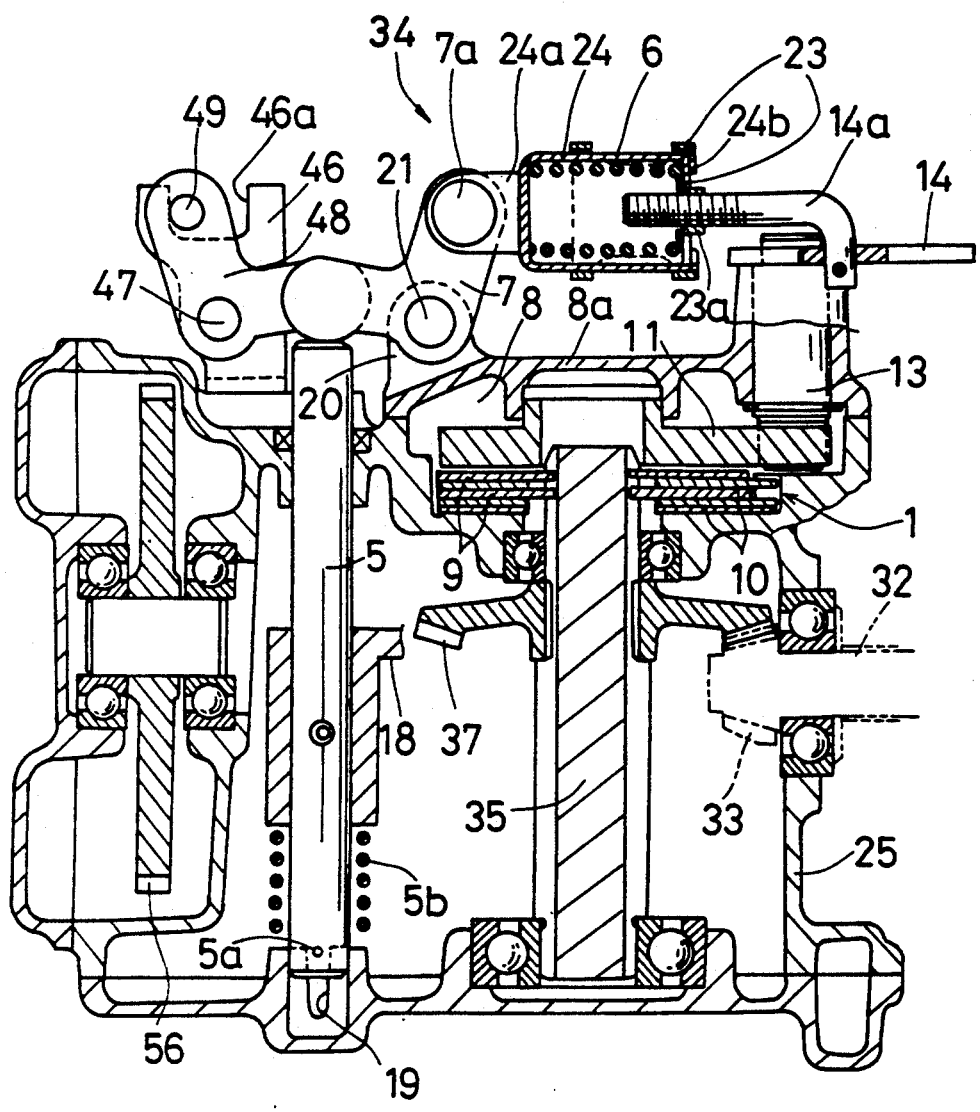
FIG. 4 is a cross-sectional plane view of the transmission casing shown in FIGS. 2 and 3 and somewhat enlarged in scale as compared to FIGS. 2 and 3.

The present invention relates to a transmission assembly for a working vehicle comprising, as illustratively shown in FIGS. 2 to 4, a brake 1 for braking the vehicle and a differential gearing 2 with which a differential-locking clutch 3 of a positive clutch type is associated.

Figure 1:
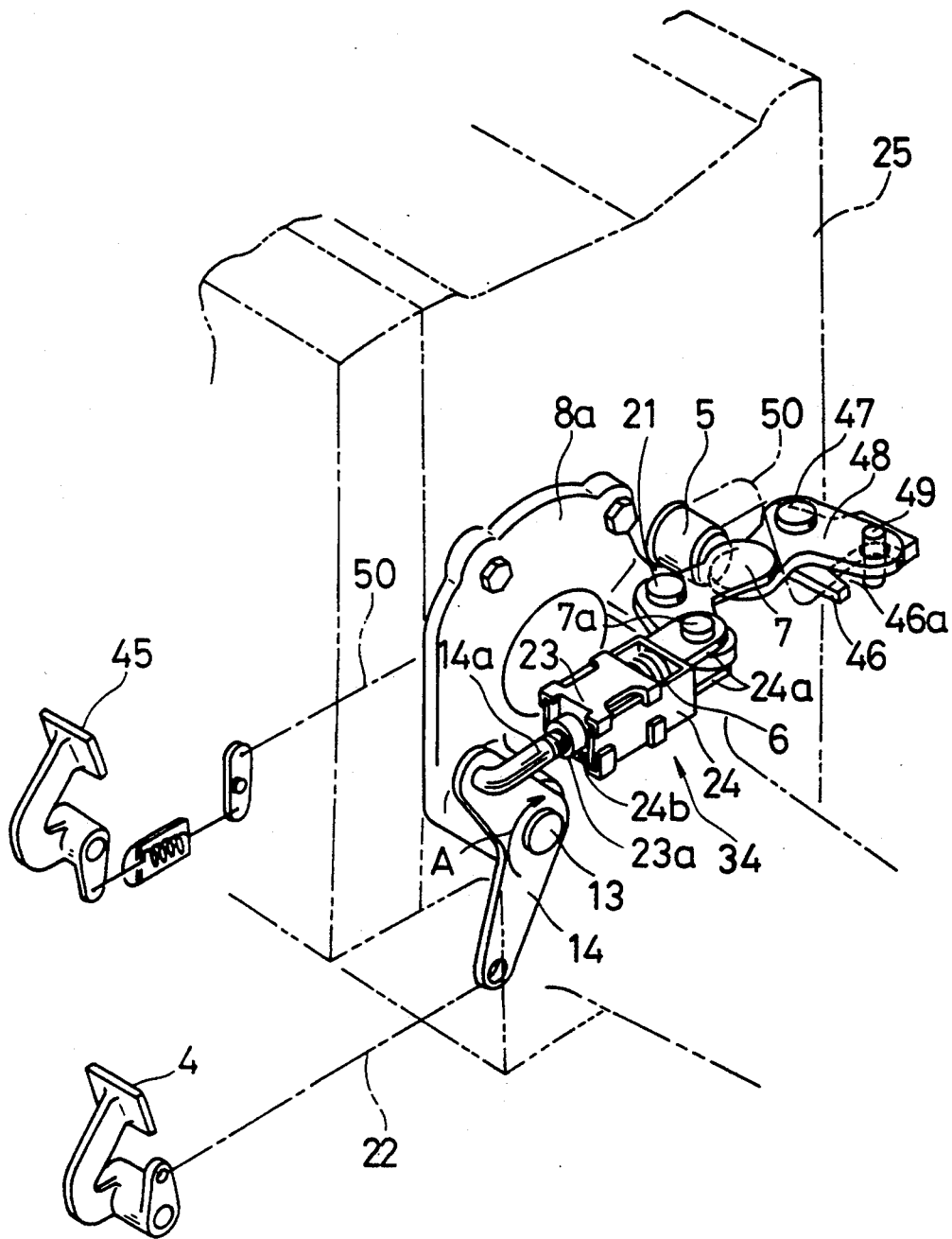
FIG. 1 is a schematic perspective view showing a part of a mower tractor in which an embodiment of the transmission assembly according to the present invention is employed.

According to the present invention and as illustratively shown in FIGS. 1 and 4, a brake-actuating device 4 for the brake 1 is operatively connected to a clutch-operating member 5 for the differential-locking clutch 3 through a connecting mechanism 34 including a spring 6 which is operable, when the brake-actuating device 4 is operated so as to actuate the brake 1, to store an actuating force for the clutch-operating member 5.

Consequently, even if clutch members of one and the other sides of the positive locking clutch 3 are not in a proper alignment of causing an interlocking between them when the brake-actuating device 4 is operated so as to actuate the brake 1, the spring 6 permits, while it is storing an actuating force for the clutch-operating member 5, the brake-actuating device 4 to be operated to its final position where the brake 1 is fully actuated. Then, the differential-locking clutch 5 is operated, when a proper interlockable alignment between the clutch members is established in a slight additional time, through the clutch-operating member 5 by the actuating force which has been stored by the spring 6. That is, the brake 1 is actuated quickly and then, while the vehicle is still running with a low speed, the differential-locking clutch 3 is operated so as to disable the differential gearing 2. From this, both of the stopping of vehicle at its straight travel condition and reduction of the braking distance of vehicle are successfully attained.

The connecting mechanism 34 may preferably include, as also shown in FIGS. 1 and 4, a movable first engaging member 7 which is engaged to the clutch-operating member 5 such that this engaging member 7 may be moved by the actuating force stored by spring 6 so as to actuate the clutch-operating member 5. Further, a movable second engaging member 48 is provided such that it is operated to move by a clutch-operating device 45 for the differential-locking clutch 3. This second engaging member 48 is also engaged to the clutch-operating member 5 such that this member 48 actuates, when it is moved by the clutch-operating device 45, the operating member 5 independently of the first engaging member 7.

The first and second engaging members 7 and 48 both of which are engaged to the clutch-operating member 5 permit an independent operation of the differential-locking clutch 3 by means of the clutch-operating device 45. Consequently, the differential gearing 2 can be disabled optionally at a non-actuated condition of the brake 1.

The clutch-operating member set forth above may preferably be composed of a slidable shaft 5 which carries a clutch shifter 18 for operating the differential-locking clutch 3. To such slidable shaft 5, both of the first and second engaging members 7 and 48 may be engaged at one end face of the shaft 5.

The slidable shaft 5 may be disposed within a transmission casing 25, within which the differential gearing 2 and differential-locking clutch 3 are disposed, such that one end portion of this shaft 5 including the one end face set forth above extends outwardly of the transmission casing 25. For the purpose of an easy arrangement and of an easy assembly, it is preferred that the first and second engaging members 7 and 48 are supported rotatably by first and second support pins 21 and 47 which are disposed in a parallel relationship at an outside of the transmission casing 25 and are supported by this casing.

DESCRIPTION OF A PREFERRED EMBODIMENT

The embodiment shown is employed in a mower tractor having a transmission casing 25, shown in FIG. 2, which is disposed between left and right rear wheels (not shown). The left and right rear wheels are driven to rotate so as to run the tractor through a transmission mechanism which is disposed within the transmission casing 25.

As shown in FIG. 2, a plate member 26 having a relatively large thickness is secured to a front of the transmission casing 25. A hydrostatic transmission 27 for changing the vehicle traveling speed non-stepwisely is provided and comprises a hydraulic pump 28 of a variable displacement type, which is mounted on a rear surface of an upper half of the plate member 26 and is located at an upper portion within the transmission casing 25, and a hydraulic motor 29 of a fixed displacement type which is mounted on a front surface of a lower half of the plate member 26 and is located at an outside of the transmission casing 25. Pump shaft 30 of the hydraulic pump 28 extends forwardly of the plate member 26 for receiving power from an engine (not shown). A fluid pump 31 for supplementing fluid to the hydrostatic transmission 27 is fashioned to a trochoid pump by employing the pump shaft 30 as its pump drive shaft and is mounted on a front surface of the plate member 26. Motor shaft 32 of the hydraulic motor 29 extends backwardly through the plate member 26 into the transmission casing 25 and carries at its rear end a small bevel gear 33. In FIG. 2, numeral 28a designates a swash plate of hydraulic pump 28 the inclination angle of which is varied for changing the vehicle traveling speed.

As shown in FIGS. 2 and 3, a transmission shaft 35 extending laterally of the transmission casing 25 is disposed within this casing at a level same as that of the motor shaft 32. Left and right rear wheel axles 36 are disposed at an underside of the transmission shaft 35 and extend leftwards and rightwards from the transmission casing 25. The transmission shaft 35 is drivenly connected to the motor shaft 32 by meshing a large bevel gear 37, fixedly mounted on the shaft 35, with the small bevel gear 33 referred to above. A differential gearing 2 is disposed between the left and right wheel axles 36 and comprises a large input gear 38 which is meshed with a small gear 39 formed integrally on the transmission shaft 35. The input gear 38 is fixedly secured to a differential carrier 40 which is rotatably mounted on the wheel axle 38 of one side. As is usual, the differential gearing 2 comprises a pair of pinion gears 42, mounted on a pinion shaft 41, and a pair of side gears 43, mounted on the left and right wheel axles 36, which are meshed as shown in FIG. 3.

As shown in FIGS. 3 and 4, a brake 1 for braking the vehicle is disposed at one end portion of the transmission shaft 35 and within a brake chamber 8 which is formed in an outer surface of the transmission casing 25. This brake 1 is fashioned to a frictional type having plural frictional elements 9, which are slidably but non-rotatably mounted on the transmission shaft 35, and another plural frictional elements 10 which are slidably but non-ratatably supported by the transmission casing 25. A pressure plate 11 is faced with the frictional elements 9 and 10, and a cam mechanism having plural balls 12 is disposed between a cover 8a for the brake chamber 8 and the pressure plate 11. A control shaft 13 extends, as shown in FIG. 4, through the cover 8a and engages the pressure plate 11. It is fashioned that, when the control shaft 13 is rotationally displaced, the pressure plate 11 is given a rotational displacement by which balls 12 of the cam mechanism push the pressure plate 11 to move toward the frictional elements 9 and 10 whereby a frictional engagement of these elements is caused and, therefore, the brake 1 is actuated. A brake arm 14 is attached to an outer end of the control shaft 14.

As shown in FIG. 3, a differential-locking clutch 3 is provided and comprises a clutch sleeve 15 which is slidably disposed on a boss portion of the differential carrier 40. This sleeve 15 carries plural locking pins 16 which extend through the carrier 40 and may be projected into engaging recesses 17 in the boss of the differential side gear 43 of one side. When the locking pins 16 are projected into recesses 17, the differential carrier 40 is non-rotatably connected to one of the wheel axles 36 so that the differential gearing 2 is disabled. Accordingly, the differential-locking clutch 3 is of a positive clutch type which is operable to disable the differential gearing 2 by a meshing or interlocking engagement of the locking pins 16 with one of the differential side gears 43. A positive clutch comprising clutch members having meshable or interlockable clutch teeth may, of course, be employed in place of the differential-locking clutch 3 shown. For operating the differential-locking clutch 3, a slidable shaft 5 which extends laterally of the transmission casing 25, as shown in FIGS. 2 and 4, is disposed within and supported by the casing 25 and carries a fork-shaped clutch shifter 18 which engages at its forked end the clutch sleeve 15. As shown in FIG. 4, this slidable shaft 5 extends at its one end out of the transmission casing 25 and is prevented from a rotational displacement by a stop mechanism comprising a pin 5a, attached to an inner end portion of shaft 5, and a recess 19 in an inner wall of the transmission casing. A return spring 5b is disposed around the slidable shaft 5 and biases the shaft 5 and clutch shifter 18 to move toward a direction of causing a sliding displacement of the clutch sleeve 15 away from the differential gearing 2.

As shown in FIG. 1, a brake pedal 4 is provided as an actuating device for the brake 1 and a differential lock pedal 45 is provided as an operating device for the differential-locking clutch 3. As shown in FIGS. 1 and 4, a bracket 46 is fixedly attached to an outer surface of the transmission casing 25 at a location adjacent to the outer end of the slidable shaft 5. A bell crank-shaped clutch arm 48 is rotatably supported by this bracket 46 through a vertical pin 47 and is engaged at its one end to the outer end face of shaft 5. A pin 49 is attached to the other end of the clutch arm 48. A control cable 50 which is tensioned when the differential lock pedal 45 is taken down is connected to the pin 49. The pin 49 extends into a recess 46a in the bracket 46 such that the rotational displacement of clutch arm 48 is limited in scope by the engagement of pin 49 to one and the other side walls of the recess 46a. When the differential lock pedal 45 is taken down, the clutch arm 48 is rotationally displaced by the control cable 50 about the pin 47 toward a direction of pushing the slidable shaft 5 into the transmission casing 25. By this, the slidable shaft 5 and clutch shifter 18 are slidingly displaced so that the clutch sleeve 15 is slidingly displaced toward the direction of operating the differential-locking clutch 3.

As shown in FIGS. 1 and 4, another bell crank-shaped clutch arm 7 is provided and is supported rotatably by a bracket 20, which is formed integrally on an outer surface of the brake cover 8a, through a vertical pin 21. This clutch arm 7 is also engaged to the outer end face of the slidable shaft 5. The clutch arm 7 is operatively connected to the brake pedal 4 through a connecting mechanism 34 including a spring 6 in a fashion which will be detailed hereinafter.

The brake arm 14 referred to before is bell crank shaped and extends generally along a vertical direction. This arm 14 is operatively connected at its lower end to the brake pedal 4 through a control cable 22 which is tensioned when the pedal 4 is taken down. When the brake pedal is taken down, the brake arm 14 is rotationally displaced toward the direction of arrow A shown in FIG. 1 and, by this, the control shaft 13 is rotated so as to actuate the brake 1. A rod 14a is connected to an upper end portion of the brake arm 14 and extends toward the clutch arm 7. Spring 6 is disposed between a push member 23, which is secured to the rod 14a, and a reaction member 24 which is rotatably connected to the clutch arm 7 using a vertical pin 7a. The push member 23 comprises an end wall having a nut 23a, secured thereto, with which the rod 14a is threadingly engaged, an upper wall having two pairs of projections extending downwardly therefrom, and a lower wall having two pairs of projections extending upwardly therefrom. The reaction member 24 is generally shaped to have an elongated C-letter configuration including an end wall, which is located opposite to that of the push member 23, and is slidably received by the upper and lower walls and their projections of the push member 23. The reaction member 24 further includes at the outer surface of its end wall a fork-shaped connecting portion 24a at which the reaction member is connected to the clutch arm 7. The ends of spring 6 are abuttingly engaged to the end walls of the push member 23 and reaction member 24. A stop member 24b is attached to the reaction member 24 and is abuttingly engaged to the outer surface of the end wall of push member 23 so as to prevent getting-away of this member 23.

Consequently, when the brake pedal 4 is taken down so as to displace the brake arm 14 along the direction of arrow A shown in FIG. 1 whereby the brake 1 shown in FIGS. 3 and 4 is actuated, the push member 23 is moved toward the reaction member 24. In a case where the locking pins 16 shown in FIG. 3 are in alignment with the engaging recesses 17 of the differential side gear 43, such movement of the push member 23 is transmitted immediately to the reaction member 24 through the spring 6 with the spring being somewhat compressed so that the clutch arm 7 is rotationally displaced about the vertical pin 21 toward a direction of pushing the slidable shaft 5 whereby the differential-locking clutch 3 is operated without delay through the shaft 5 and clutch shifter 18. In a case where the locking pins 16 are not aligned properly with the recesses 17 when the brake pedal 4 is taken down, the reaction member 24 is once prevented from being moved so that interval between the push member 23 and reaction member 24 is largely reduced and, therefore, the spring 6 is largely compressed so as to store an actuating force for the slidable shaft 6. Then, when the locking pins 16 are aligned properly with the recesses 17 by some rotation of the gear 43, the differential-locking clutch 3 is operated by the actuating force stored by spring 6. This spring 6 biases, still in the operated condition of locking clutch 3, the movable members 7, 5, 18 and 15 with some biasing force to move toward clutch-operating directions.

In a non-operated condition of the locking clutch 3, engagement of each clutch arm 7, 48 to the slidable shaft 5 is kept by the biasing force of the return spring 5b for returning the locking clutch 3 to the non-operated condition. When required or desired, the differential-locking clutch is operated independently of the brake 1 using the differential lock pedal 45.

As shown in FIG. 2, a mid-PTO shaft 53 extends forwardly from the transmission casing 25 for taking-off a driving power for a mid-mount working implement (not shown), such as a mower, which is used in conjunction with the tractor. The pump shaft 30 of hydraulic pump 28 extends backwardly and has thereon a freely rotatable gear 54 which may be coupled selectively to the shaft 30 by means of a fluid-operated PTO clutch 55 mounted on the pump shaft. The gear 54 is adapted to drive a gear 57, fixedly mounted on the mid-PTO shaft 53, through an intermediate gear 56. In FIG. 3, numeral 58 designates a control arm which is attached to one of the support shafts for the pump swash plate 28a for the purpose of varying the inclination angle of swash plate 28a.

I claim:

1. A transmission assembly for a working vehicle comprising a brake (1) for braking the vehicle and a differential gearing (2) with which a differential-locking clutch (3) of a positive clutch type is associated, characterized in:

that a brake-actuating device (4) for operating said brake (1) is operatively connected to a clutch-operating member (5) for operating said differential-locking clutch (3) through a connecting mechanism (34) including a spring (6) which is operable, when said brake-actuating device is operated so as to actuate said brake, to store an actuating force for said clutch-operating member for actuating said differential-locking clutch.

2. The transmission assembly as set forth in claim 1, wherein said connecting mechanism (34) further includes a movable first engaging member (7) which is engaged to said clutch-operating member (5) such that said first engaging member is moved by said actuating force stored by said spring (6) so as to actuate said clutch-operating member, and wherein a movable second engaging member (48) which is operated to move by a clutch-operating device (45) for said differential-locking clutch (3) is engaged to said clutch-operating member (5) such that said second engaging member actuates, when moved by said clutch-operating device, said clutch-operating member independently of said first engaging member (7).

3. The transmission assembly as set forth in claim 2, wherein said clutch-operating member is composed of a slidable shaft (5) which carries a clutch shifter (18) for operating said differential-locking clutch (3), both of said first and second engaging members (7, 48) being supported rotatably and being engaged to one end face of said slidable shaft (5).

4. The transmission assembly as set forth in claim 3, wherein said slidable shaft (5) is disposed within and is slidably supported by a transmission casing (25) within which said differential gearing (2) and said differential-locking clutch (3) are disposed, one end portion of said slidable shaft including said one end face extending outwardly of said transmission casing, said first and second engaging members (7, 48) being supported rotatably by first and second support pins (21, 47) which are disposed in a parallel relashionship at an outerside of said transmission casing (25) and are supported by said casing.

* * * * *